United States Patent [19]

Streifer

[11] 4,052,715
[45] Oct. 4, 1977

[54] DIGITAL HALF-TONE GREY SCALE EXPANSION SYSTEM

[75] Inventor: William Streifer, Palo Alto, Calif.

[73] Assignee: Xerox Corporation, Stamford, Conn.

[21] Appl. No.: 661,229

[22] Filed: Feb. 25, 1976

[51] Int. Cl.² .......................................... G03G 15/04
[52] U.S. Cl. .................................... 346/160; 358/300
[58] Field of Search .............................. 346/74 P, 160; 178/6.6 R, 6.6 A, 6.7 R; 358/300

[56] References Cited

U.S. PATENT DOCUMENTS

| | | | |
|---|---|---|---|
| 3,294,896 | 12/1966 | Young | 178/6.7 R |
| 3,564,560 | 2/1971 | Aldrich | 346/74 P |
| 3,604,846 | 9/1971 | Bahane | 178/6.7 R |
| 3,720,785 | 3/1973 | Van Auken | 346/74 P |
| 3,750,189 | 7/1973 | Fleischer | 346/74 P |

*Primary Examiner*—Jay P. Lucas
*Attorney, Agent, or Firm*—M. J. Colitz; T. J. Anderson; L. Zalman

[57] ABSTRACT

Method and apparatus for expanding the number of grey scale values in a digital flying-spot scanning system. The scanned recording medium is divided into a plurality of unit cells, each of which is assigned a desired grey scale value, and each unit cell is further divided into a plurality of subcells formed by a plurality of adjacent portions of scan lines comprising digitally controlled segments. The grey scale value of the unit cell is dependent upon the portion of the subcells within the unit cell which are activated or deactivated by the scanning beam. Additionally, the number of grey scale values between particular numbers of activated subcells is expanded by providing varying patterns of predetermined numbers of subcells within the unit cell with the varying patterns producing the optical effect of varying grey scale levels.

2 Claims, 4 Drawing Figures

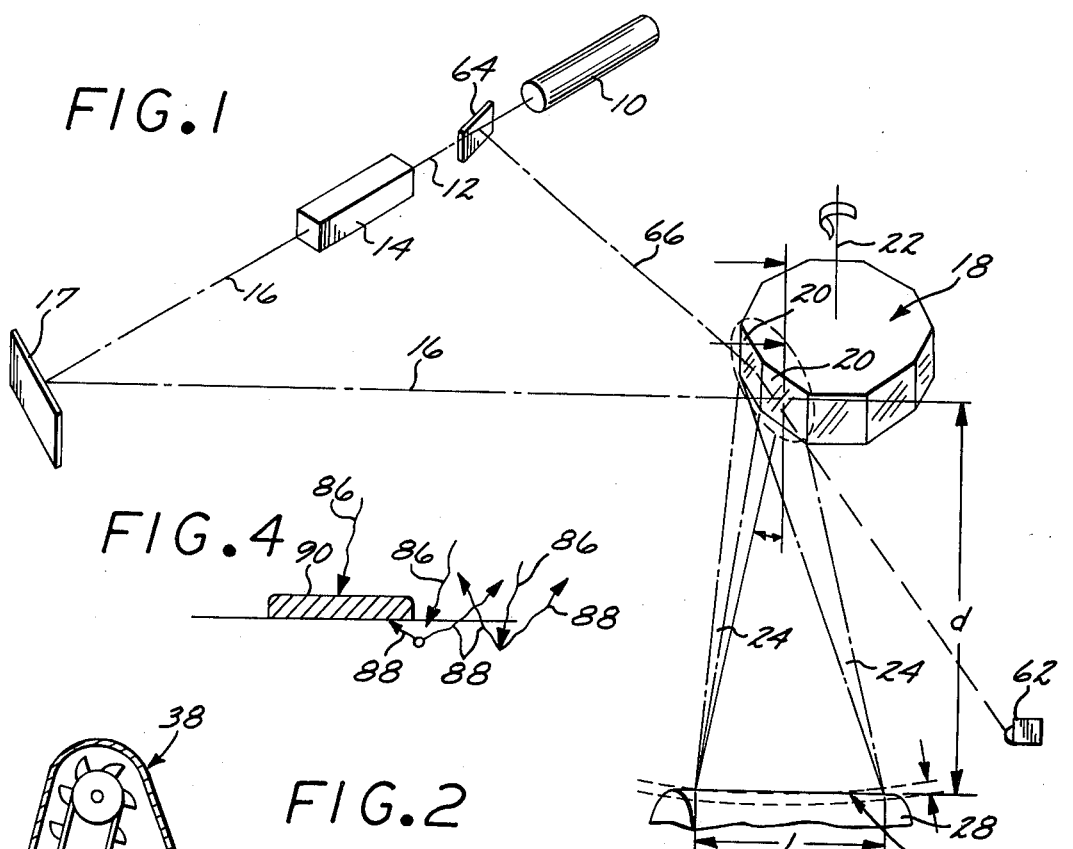
FIG.1
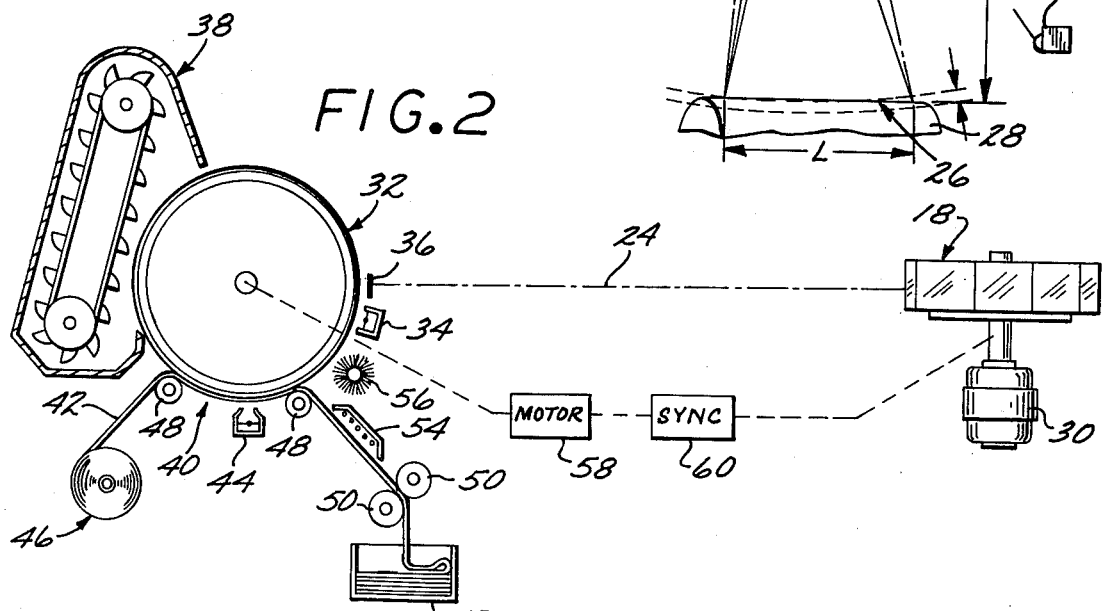
FIG.4
FIG.2
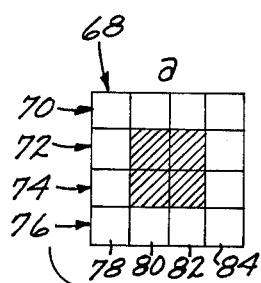
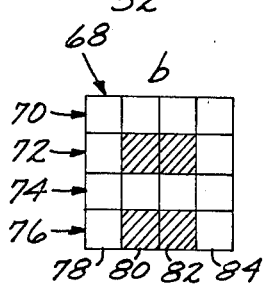
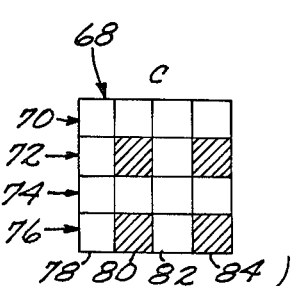
FIG.3

DIGITAL HALF-TONE GREY SCALE EXPANSION SYSTEM

BACKGROUND OF THE INVENTION

1. Field of the Invention:

The present invention relates generally to half-tone generation techniques and more particularly to the expansion of grey scale values in digitally controlled flying-spot scanning systems.

2. Description of the Prior Art:

Recent developments in optical imaging techniques have included flying-spot scanning systems in which a highly collimated light beam, preferably from a laser, is reflected by a driven reflecting surface to create a scanning light beam which transverse a focal plane imaging surface in a selected recurrent manner. Between scanning beams, the imaging surface itself is moved so that the complete imaging surface may be covered by successive scanning beams. The intensity of the scanning beam may be modulated in response to an analog or a digital signal to create an overall desired optical image.

The fly-spot scanning system has been applied to information reproduction systems such as xerography by the photo-receptive surface of a xerographic drum as the focal plane for the scanning beam. A limitation of the xerographic system, however, has heretofore precluded the reproduction of varying tone images because of the inability of the xerographic drum to accurately and consistently produce image tones other than black and white. Hence, in xerographic reproduction work, the intensity of the scanning light beam is, essentially, either "on" or "off".

Thus, there has long been a need in the field of xerographic reproduction for a means for producing variable tone images such as photographs or the like. The present invention satisfies that need.

SUMMARY OF THE INVENTION

The present invention provides a method and apparatus for expanding the range of grey scale values in a scanning, digital half-tone generating system. A unit cell includes a plurality of subcells and the unit cell is assigned a particular grey scale value in which a predetermined number of subcells are digitally activated. The grey scale value for a particular predetermined number of activated subcells can be varied by arranging the activated subcells in predetermined patterns which produce varying fringing effects of the activated subcells to thereby vary the optical tone effect.

In the presently preferred embodiment of the invention, a fly-spot scanning system is utilized with a xerographic drum and the flying-spot is a highly collimated beam of light such as that developed by a laser. The unit cell includes adjacent portions of successive scans with each portion of the scan being divided into essentially independent segments which may be activated by conventional digital modulation of the scanning beam. In addition to the fringing effect of the subcells arranged in particular patterns, the xerographic reproduction process itself influences the variability of the grey scale expansion in that, for example, adjacent subcells on a particular scan line will be processed somewhat differently than subcells on adjacent scan lines. The overall effect of varying the pattern and the individual xerographic reproduction process itself is empirically tested to arrive at the overall variability of the grey scale expansion for particular predetermined numbers of activated subcells.

These and other features of the grey scale expansion system of the present invention will become apparent from the following detailed description.

BRIEF DESCRIPTION OF THE DRAWINGS

FIG. 1 is a perspective view of a flying-spot scanning system used in the system of the invention;

FIG. 2 is an elevational view of the system shown in FIG. 1;

FIG. 3 is a diagrammatic view of a unit cell with varying subcell patterns; and

FIG. 4 is a diagrammatic illustration of the fringing effect utilized in the present invention to produce varying grey scale values.

DESCRIPTION OF THE PREFERRED EMBODIMENT

Referring now to FIG. 1, a flying-spot scanning system in which the grey scale expansion system of the present invention is utilized is diagrammatically illustrated with a light source 10 that provides a beam of light 12 having a limited lateral extent. While various light sources can be used, it is preferable that the light source 10 be a laser that generates a highly collimated beam of monochromatic light. Various commercially available lasers can be employed for this purpose, including the ruby laser, the helium-neon lasers, helium-cadium lasers or semiconductor lasers such as gallium-arsenide, indium-arsenide or indium-phosphide lasers. The aforementioned lasers are capable of generating monochromatic light beams which are highly collimated and which have a very limited lateral extent, typically with beam widths, as measured between the extremities of the beam where the intensity is 1/10 of the light intensity at the beam center, which range from 5 to about 50, commonly from about 10 to about 25 microns.

The highly collimated light beam 12 is directed through modulator 14 which can be any suitable electro-optical or acousto-optical device for receiving digital information and digitally modulating or turning the beam "on" or "off" in accordance with the digital modulating signals. Typical modulators that can be used include a Pockel's cell that utilizes a light transmitting crystal having a variable index or refraction which is responsive to applied digital voltages, e.g., a potassium dihydrogen phosphate crystal. The digital signal input to the modulator, therefore, can comprise a unidirectional voltage signal. The modulator 14 is thereby effective in either permitting passage of light beam 12 along its projected axis with a predetermined intensity or of completely inhibiting the passage of the light beam 12.

The light beam 12, as controlled through the electro-optical modulator 14, is directed as a digitally controlled collimated light beam 16 onto a reflective surface such as a mirror 17 which directs the beam 16 toward a multifaceted polygon 18. The polygon 18 is a multisided body bearing a plurality of mirror surfaces or facets 20. The polygon 18 is supported on a rotational axis 22 and driven by a drive means capable of spinning the polygon at relatively high rotational speeds, e.g., from 10,000 to about 30,000 rpm's and preferably from 15,000 to 25,000 rpm's. The light beam 16 incident on the mirrored surfaces or facets 20 is reflected therefrom in the form of well-defined light beams 24 which sweep across the length L of a focal plane 26 at a velocity determined by the rotational speed of polygon 18 and also the distance from the polygon to the focal plane.

A complete description of the operation of the flying-spot scanning system briefly described above can be found in U.S. Pat. No. 3,867,571, issued Feb. 18, 1975. Also, while the flying-spot scanning system has been described with reference to the preferred use of a multifaceted polygon 18, it should be appreciated that other devices such as mirrored piezoelectric crystals or planar reflecting mirrors driven in an oscillatory fashion could also be employed.

The focal plane 26 provides a visual readout surface for the digitally modulated scanning light beams 24. The focal plane 26 is proximate a recording medium 28 having a photo-receptor surface of a photosensitive material such as a photographic film or the surface of a xerographic element such as a drum or belt which may be electrostatically activated by the scanning light beams 24.

Referring now to FIG. 2, the polygon 18 is shown with a drive means such as motor 30 which is driven in a timed manner with the rotating recording medium 32 which is in the form of a xerographic drum for the presently preferred embodiment of the invention. The recording facilities are of conventional xerographic structure with a drum 32 which rotates consecutively through a charging station 34 having a corona charging device and an exposure surface 36 which receives the focused spots of light from the light beams 24 as they are directed in sweeps across the surface by rotating polygon 18. The facilities also include a conventional developing station 38, depicted by a cascade or magnetic brush development enclosure and a transfer station 40 where a web of copy paper 42 is passed into the contact with the drum 32 and receives an electrostatic discharge from corona discharge element 44 to induce transfer of the developed image from the drum 32 to the copy paper 42. The copy paper, which is supplied from a wheel 46, passes around guide rollers 48 and through drive rollers 50 into receiving bins 52. A thermal device 54 fuses the toner to the copy paper 42 as the paper passes into bin 52. The drum 32 is then cleansed by a cleaning device such as the rotating brush 56 before the drum surface again rotates into the charging station 34.

The drum 32 is driven at a constant speed by a motor 58 which is timed by a synchronizing control means 60 with the drive motor 30 of the polygon 18 to provide a series of continuous scans transversely across the surface of the drum which overlap slightly to provide a continuous pattern developed across the entire circular surface of the drum. In addition, the beginning and end of a particular scan line is sensed by a sensor 62 which intermittently receives a portion of the light beam 12 which is reflected from a partially transparent optical element 64 in the path of the light beam 12 from the light source 10. As the polygon 18 rotates, the reflected light beam 66 intermittently reaches the sensor 62 to signal the end of one scanning light beam and the beginning of the following scanning light beam from an adjacent facet 20.

Turning now to FIG. 3, the operation of the expanded grey scale expansion system of the invention is diagrammatically illustrated. In particular, the complete area over which a half-tone image is to be generated is divided up into a plurality of unit cells 68, each of which is to have a predetermined half-tone value. As presently envisioned, each unit cell is made up of sections of adjacent scan lines 70, 72, 74 and 76. Each scan line section is divided into segments 78, 80, 82 and 84, with each segment being illuminated or not by the light beam. The presence of the illumination to each segment is controlled by the digital signals applied to the modulator 14 (FIG. 1). Thus, each unit cell 68 is divided up into a plurality of subcells, with each subcell being individually digitally controlled. It should be appreciated that, in the presently preferred embodiment of the invention, the unit cells and subcells first appear as electrostatically charged spots on the xerographic drum 32 and when developed and applied to the paper 42, will then be black spots on a white paper surface with the pattern depending on how the subcells were originally electrostatically charged.

In generating the half-tone image, each unit cell is assigned a particular level of grey scale from white to black, with the total number of possible grey scale levels being dependent upon the size of the unit cell and the number of subcells contained therein. In the presently preferred embodiment of the invention, using the xerographic process, each subcell is either black or white and the grey scale level is dependent upon the number of black subcells and white subcells and, as a feature of the invention, the pattern in which the subcells are arranged within each unit cell.

A principle upon which it is believed that the system of the invention operates is that, for a given number of black subcells, the optical effect of increasing overall darkness of the unit cell varies according to the location of the individual black subcells. It is believed that, the larger the ratio of the length of the perimeters around the black subcells to the area occupied by those subcells, the greater the optical effect of darkness for the unit cell 68. It is also believed that, as shown in FIG. 4, the fringing effect of the light rays 86 striking the areas immediately around the edge of the black subcells results in reflected light rays 88 which, if close to the black areas 90, are absorbed by the black areas so that the overall effect of the black area 90 "fringes" beyond its actual perimeter. It will be appreciated that the greater overall perimeter exposed will produce a greater fringing effect, resulting in the unit cell appearing darker for those larger perimeters.

For example, as can be seen in FIG. 3A, the perimeter exposed is eight subcell lengths, while the area is four units, resulting in a perimeter-to-area ratio of two to one.

In FIG. 3B, the separation of the subcells results in four more perimeter lengths being exposed for a total of twelve, resulting in a perimeter-to-area ratio of three to one.

And finally, in FIG. 3C, all four subcells are separated for a total perimeter length of sixteen and a perimeter-to-area ratio of four to one.

Thus, FIG. 3B will appear darker than FIG. 3A, and FIG. 3C will appear darker than FIG. 3B. It should be noted that FIG. 3 is an expanded illustrated diagram and in actual practice, both the unit cells and the subcells would be relatively small and be practically unresolvable by the unaided human eye.

There is also believed to be some overlap between the number of darkened subcells and their positions so that similar optical effects can be produced either with a predetermined number of blackened subcells or by positioning a different predetermined number of subcells in a different manner. Furthermore, it is known that, for electrostatically charged areas on a xerographic drum 32, horizontal areas will be developed slightly differently than vertically oriented areas so that it must be empirically determined for each type of development system 38 utilized what effect different pattern arrangements, either horizontally oriented or vertically oriented, will have.

In summary, while a presently preferred embodiment of the digital half-tone grey scale expansion system has been described in detail, it should be appreciated that numerous structural variations in both the illustrated optical system and in the pattern arragements for the unit cells and subcells may be utilized. Therefore, the scope of the invention is not to be limited except by the following claims.

I claim:

1. A variable half-tone image generating system for use in a flying-spot scanning system comprising:
   an image surface having at least one unit cell which is divided into a plurality of elemental sub-cells of a given area,
   means for producing a light beam of high intensity,
   means adapted to scan said light beam across each of said sub-cell areas of said at least one unit cell, and
   means for both (1) modulating the intensity of said light beam so that only a selected number of said sub-cell areas within said at least one unit cell are exposed to said scanning light beam and (2) varying the position of said selected number of sub-cells within said at least one unit cell so that the ratio of the area of said selected number of sub-cells to the unexposed perimeter of said selected number of sub-cells varies to thereby provide a varying grey scale within said unit cell from a fixed number of exposed sub-cells.

2. A method for providing a number of grey scale values on an image surface from a fixed number of addressed areas of said image surface comprising the steps of:
   dividing said image surface into a plurality of unit cells arrayed across said image surface and subdividing each of said unit cells into a plurality of arrayed sub-cells of a given area,
   selecting a predetermined number of said sub-cells of at least one of said unit cells to be exposed to a light beam, and
   varying the location of said predetermined number of sub-cells within said at least one unit cell to vary the perimeter to area ratio of said sub-cells of said at least one unit cell exposed to said light beam to thereby provide a number of grey scale values within said at least one unit cell from a fixed number of exposed sub-cells of said at least one unit cell.

* * * * *